Oct. 14, 1941.   C. W. HUTCHISON   2,259,208
FLUID CLUTCH
Filed Jan. 24, 1941   2 Sheets-Sheet 1
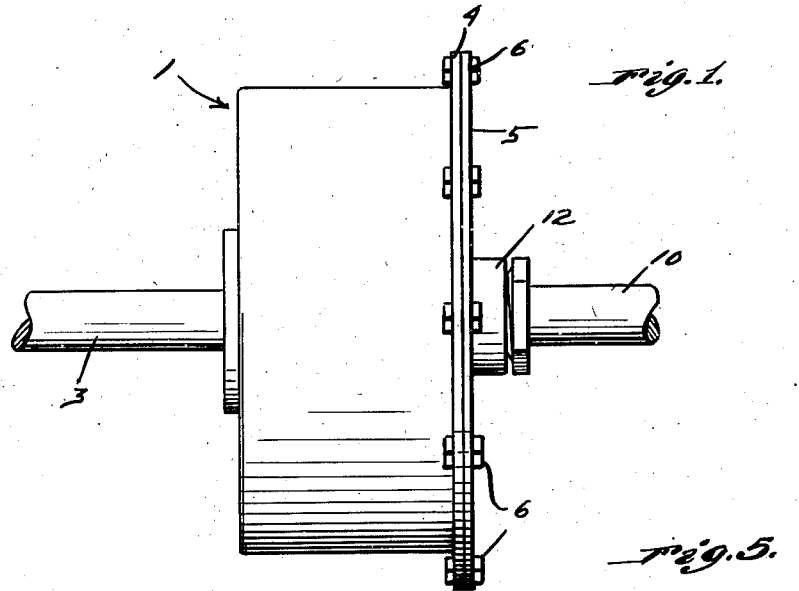
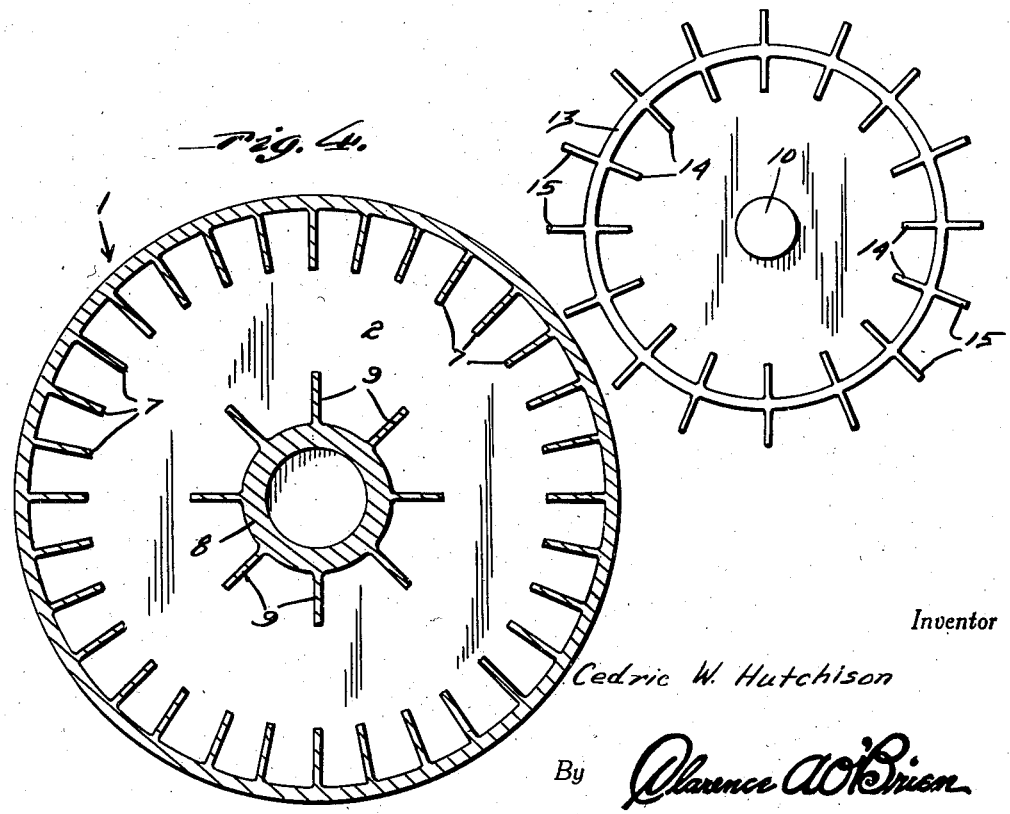
Inventor
Cedric W. Hutchison
By Clarence A. O'Brien
Attorney Oct. 14, 1941.  C. W. HUTCHISON  2,259,208
FLUID CLUTCH
Filed Jan. 24, 1941  2 Sheets-Sheet 2

Inventor
Cedric W. Hutchison
By Clarence A. O'Brien
Attorney

Patented Oct. 14, 1941

2,259,208

UNITED STATES PATENT OFFICE 2,259,208

FLUID CLUTCH

Cedric W. Hutchison, El Monte, Calif., assignor of thirty-five per cent to Robert N. Hutchison, Covina, Calif.

Application January 24, 1941, Serial No. 375,867

2 Claims. (Cl. 192—58)

The present invention relates to new and useful improvements in fluid clutches for use particularly on motor vehicles although it will be understood, of course, that the device may be used for any other purpose for which it may be found adapted and desirable.

The primary object of the invention is to provide, in a manner as hereinafter set forth, a clutch of the aforementioned character which is adapted to transmit power from a driving member to a driven member without the use of the comparatively complicated and expensive gear arrangement in widespread use at present.

Another very important object of the invention is to provide a fluid clutch of the character described which comprises a novel combination and arrangement of vanes whereby maximum efficiency and reliability will be had.

Other objects of the invention are to provide a fluid clutch of the character set forth which will be comparatively simple in construction, strong, durable, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a fluid clutch constructed in accordance with the present invention.

Figure 4 is a cross sectional view through the driven member.

Figure 5 is a view in end elevation of the driving member.

Figure 2:
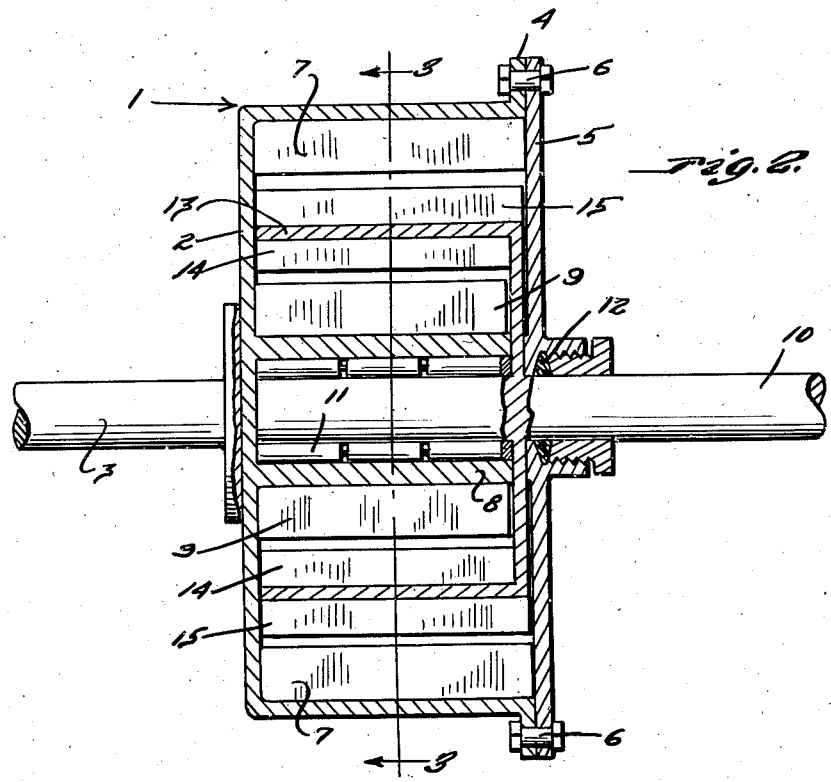
Figure 2 is a view in vertical longitudinal section through the device.
Figure 3:
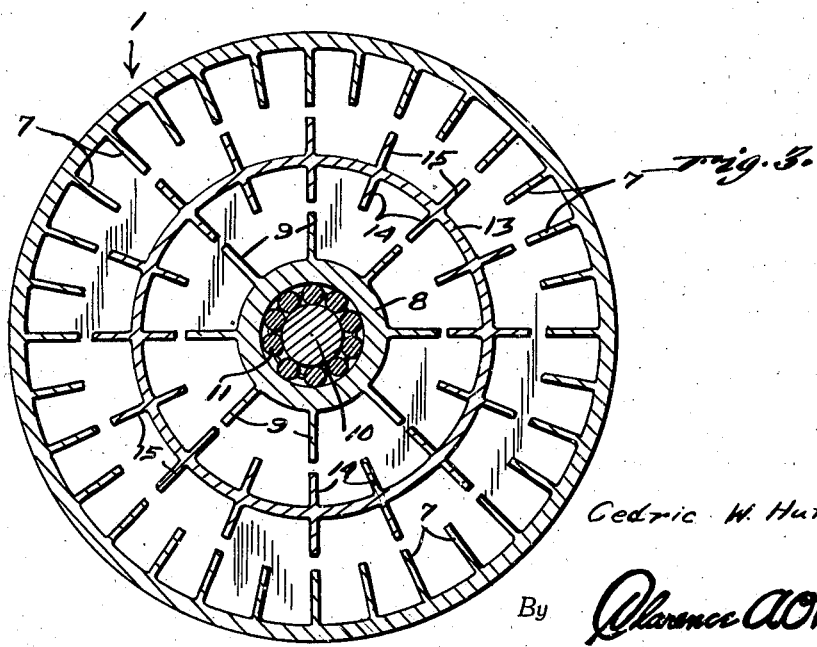
Figure 3 is a cross sectional view, taken substantially on the line 3—3 of Figure 2.

Referring now to the drawings in detail, it will be seen that the embodiment of the invention which has been illustrated comprises a substantially cylindrical housing 1 of suitable metal. The housing 1 includes an integral, closed end 2 which is rigidly secured on one end of a driven shaft 3. The other end of the housing 1 is provided with an external, apertured flange 4 and is closed by a removable plate 5 which is bolted at 6 to said flange.

The reference numeral 7 designates a plurality of spaced, radial vanes or blades in the housing 1 on the cylindrical wall thereof, which vanes extend from end to end of said housing. Of course, the plate 5 is free of the vanes 7. Projecting from the end wall 2 of the housing 1 and terminating in spaced relation to the removable plate 5 is a sleeve 8. Radiating from the sleeve 8 are vanes 9.

Extending rotatably into the housing 1 through the plate 5 is a drive shaft 10. It will be observed that the drive shaft 10 projects into the sleeve 8 and is spaced therefrom. A bearing 11 is provided between the sleeve 8 and the inner end portion of the drive shaft 10. It may be well to here state that the housing 1 is for the reception of oil or other suitable fluid. A packing 12 is provided on the plate 5 for preventing leakage around the drive shaft 10.

Mounted on the drive shaft 10, in the housing 1, is a drum 13 the annular flange portion of which extends between the vanes 7 and 9 and is spaced therefrom. Mounted on the interior of the drum 13 are vanes 14 for coaction with the vanes 9. On the outside of the drum 13 are radial vanes 15 which coact with the vanes 7.

It is thought that the operation of the device will be readily apparent from a consideration of the foregoing. Briefly, when the drum 13 rotates with the shaft 10 the vanes 15 and 14 throw the fluid in the housing 1 against the vanes 7 and 9 thus driving said drum and shaft 3 in a manner thought to be obvious. When the shaft 10 is turning slowly, as when the engine of the vehicle is idling, the force with which the fluid will be thrown against the vanes 7 and 9 will be so slight as to permit the driven member to remain stationary. Of course, the load on the driven member will determine the amount of slippage occurring between said driven member and the driving member at a given speed of the latter. Any suitable arrangement of bearings may be provided for supporting the shafts 3 and 10.

It is believed that the many advantages of a fluid clutch constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A fluid clutch comprising a driven shaft, a housing, for the reception of a fluid, fixed on said driven shaft, a drive shaft extending rotatably into the housing, a drum on said drive shaft operable in the housing, vanes on the inner and outer peripheries of said drum, a sleeve in the housing rotatable therewith and spaced concentrically from the drive shaft, a bearing between said sleeve and said drive shaft, vanes radiating from the sleeve and cooperable with the inner drum vanes, and vanes on the inner periphery of the housing cooperable with the outer drum vanes.

2. In a fluid clutch, a rotatable fluid housing sealed against the escape of fluid, vanes on said housing, a shaft extending into said housing and located concentrically of the latter, a supporting means fixed on said housing and located concentrically of the latter and having the shaft extending therein, a bearing carried by said supporting means and rotatably supporting said shaft, vanes on said supporting means, a drum secured on said shaft, and groups of vanes on said drum and one group of vanes coacting with the first-named vanes and the second group of vanes coacting with the second-named vanes to provide a variable drive between said housing and the shaft.

CEDRIC W. HUTCHISON.